United States Patent [19]
Beshai

[11] Patent Number: 6,118,792
[45] Date of Patent: Sep. 12, 2000

[54] METHOD AND APPARATUS FOR A FLEXIBLE ACCESS RATE COMMON-MEMORY PACKET SWITCH

[75] Inventor: Maged E. Beshai, Stittsville, Canada

[73] Assignee: Nortel Networks Corporation, Montreal, Canada

[21] Appl. No.: 08/976,423

[22] Filed: Nov. 21, 1997

[51] Int. Cl.[7] .................................................. H04J 3/16
[52] U.S. Cl. ...................... 370/468; 370/412; 370/235
[58] Field of Search ................................. 370/230, 412, 370/413, 414, 415, 416, 417, 418, 428, 429, 448, 357, 358, 359, 360, 369, 370, 235, 422, 252

[56] References Cited

U.S. PATENT DOCUMENTS

| | | | |
|---|---|---|---|
| 5,136,578 | 8/1992 | Beshai et al. | 370/58.1 |
| 5,390,184 | 2/1995 | Morris | 370/468 |
| 5,475,679 | 12/1995 | Munter | 370/58.2 |
| 5,502,723 | 3/1996 | Sanders | 370/60.1 |
| 5,577,035 | 11/1996 | Hayter et al. | 370/60 |
| 5,583,561 | 12/1996 | Holden | 370/395 |
| 5,594,727 | 1/1997 | Kolbenson et al. | 370/442 |
| 5,696,764 | 12/1997 | Soumiya et al. | 370/395 |
| 5,745,486 | 4/1998 | Beshai et al. | 370/352 |
| 5,838,677 | 11/1998 | Kozaki et al. | 370/389 |

OTHER PUBLICATIONS

Article "Transposed Switching of Multi–bit–rate Traffic", by M.E. Beshai et al, vol. 20, Nos. 1–5, The International Journal of Distributed Informatique, Dec. 1990.

*Primary Examiner*—Ricky Ngo
*Attorney, Agent, or Firm*—Max R. Wood

[57] ABSTRACT

A method of controlling asymmetrical port access in a common-memory (CM) multi-port data packet switch and a high-capacity flexible access rate CM data packet switch are described. The method involves providing a common-memory-access control table which defines a unique contiguous band of CM access time slots allocated to each port of the packet switch. Each access time slot is identified by a time slot identifier. Time slot identifiers are generated at a regular interval. The time slot identifiers are generated so that CM access time for each port is substantially equally spaced to minimize delay jitter. The packet switch may have an equal number of input and output ports, or more output ports than input ports. In the high-capacity CM packet switch, several CM switch modules are interlinked by middle buffers in a folded configuration to provide a packet switch having Terabit output capacity. The advantage is a packet switch architecture which supports flexible access rates to eliminate idle switch capacity, the CM access time slots being substantially equally spaced apart to reduce packet transfer delay jitter.

16 Claims, 5 Drawing Sheets

METHOD AND APPARATUS FOR A FLEXIBLE ACCESS RATE COMMON-MEMORY PACKET SWITCH

TECHNICAL FIELD

The present invention relates generally to methods and apparatus for switching data packets in a communications network. In particular, it relates to a method of providing flexible memory access in a dynamically configurable common-memory data packet switch which may be used for unicast and/or multicast packet switching applications.

BACKGROUND OF THE INVENTION

The escalating demand for telecommunications bandwidth has placed a strain on existing service delivery infrastructure and created a desire for faster and more efficient data delivery networks. The principal elements in a switched data network which determine the bandwidth capacity are the switching nodes. Many switching node architectures have been invented for efficiently switching data packets at high speeds. Data packet switching nodes have been traditionally constructed with equal ingress and egress capacities and with symmetrical ingress/egress port configurations. A symmetrical configuration is suitable if the capacity requirement of the connection to each port is identical in opposite directions. In a modern multiservice network, however, a connection may have vastly different data rates in opposite directions. For example, the connection from a user to a database may have a data rate of about 1 kb/s, whereas the connection from the database to the user may require 100 kb/s, or more. If such asymmetry is permanent, the user may be connected to the network by asymmetrical outbound and inbound links. If the asymmetry is time-variant, however, the links connecting the user to the network must be of a sufficiently high capacity to accommodate the peak rates in both directions.

Of the many data packet switch architectures that have been invented, one of the most widely used is the common-memory (CM) switch. This type of switch is widely used in data packet networks, such as ATM networks for example. In a CM switch, the switch capacity is limited by the CM access speed. In a non-blocking CM implementation, the sum of the port capacities (expressed in bits per second) is less than, or equal to, the capacity of the CM. In such switches, the ports normally access the CM in a sequential cycle, each port being given an equal time window in which to write packets to, or read packets from, the CM. This often results in idle periods when ports have no payload packets to write to, or read from, the CM. Any idle capacity resulting from port under-utilization cannot be recovered if the ports access the CM for a fixed period of time in each access cycle.

Asymmetrical unicast connections such as the one described above place traffic loads on the ingress and egress sides of a port which may differ significantly, but the total ingress rate of all input ports is always equal to the total egress rate of all output ports. In modern multiservice networks, multicasting is frequently required. Multicasting involves switching data from one input source to a plurality of outputs. When multicasting occurs, however, not only are the connection bit rates naturally asymmetrical, but the total egress rate may substantially exceed the total ingress rate. Therefore, switching multicast traffic using a symmetrical switch results in unavoidable core capacity wastage.

There therefore exists a need for an effective method of control port access to the common-memory in CM switches to maximize core utilization and switch throughput. There also exists a need for a CM switch architecture for efficiently switching unbalanced unicast traffic loads using an asymmetrical port access capacity. There further exists a need for a CM switch architecture which is especially adapted for multicasting to ensure that valuable core resources are efficiently utilized in network applications where multicasting is consistently required.

SUMMARY OF THE INVENTION

It is an object of the invention to provide a method of controlling asymmetrical port access in a common-memory multi-port data packet switch.

It is a further object of the invention to provide a method of controlling asymmetrical port access in a common-memory multi-port data packet switch utilizing an inexpensive, easily implemented, mechanism for generating port access time slot identifiers to ensure that the common-memory is utilized to its full potential while packet jitter and transit delay are reduced.

It is a further object of the invention to provide a common-memory switch architecture which is specifically designed to efficiently switch data packets in multicast switching applications.

It is yet a further object of the invention to provide a large capacity data packet switch with a folded configuration which is particularly adapted for efficiently multicasting data packets.

The invention therefore provides a method of controlling port access in a common-memory multi-port data packet switch, comprising:

defining a control cycle consisting of a fixed number of discrete common-memory access time slots;

allocating a proportional number of the access time slots to each port based on a predetermined access capacity requirement for the port; and distributing access time slots for each port in the control cycle in such a way as to reduce packet transfer delay and jitter.

In accordance with a further aspect of the invention, there is provided a flexible access rate common-memory packet switch, comprising:

a plurality of input ports and output ports;

a common-memory for switching packets between the input ports and the output ports;

means for storing an allocation of common-memory access time slots for each port, the allocation being based on a predetermined access capacity requirement for the port; and means for distributing the access time slots for each port in a control cycle of all access time slots allocated in such a way that each port accesses the common-memory in a cyclic sequence of substantially equally spaced access time slot intervals.

The invention therefore provides a method and an apparatus for a flexible access rate common-memory packet switch. In accordance with the method, a common-memory-access time period for a port of the common-memory switch is defined. The common-memory-access time period is an interval that is long enough to write a predetermined number of bytes or a predetermined number of cells to the common-memory of the switch. The common-memory-access time period may be long enough to write a large number of bytes or cells to, or read a large number of bytes or cells from, the common-memory. The access time periods are hereinafter referred to as access time slots. A common-memory-access control table is data filled to control access by each port to the common-memory core of the switch. The common-memory-access control table stores an access time allocation for each port. Each access time allocation consists of one or more access time slots, and each access time slot is identified by a time slot identifier. The access time allocation is preferably proportional to the committed access rate for each port. The access time allocation may be performed periodically by a predictive algorithm for predicting the traffic load for each port based on traffic measurements. In that case, the predictive algorithm monitors traffic loads at each port and periodically updates the access time allocation for each port based on short term traffic load predictions or short term traffic load measurements. Using such a feature requires an input buffer of adequate capacity at each node. Regardless of how the contents of common-memory-access control table is determined, the purpose of the table is to allocate CM access time slots to the ports in order to maximize usage of the core resources by the input and output ports of the switch. With proper control, the total capacity of the input and output ports may significantly exceed the core capacity of the switch, without undue risk of packet loss or service degradation.

After the time slot identifiers have been stored in the common-memory-access control table, an upper bound and a lower bound of the time slot identifiers for each port are broadcast to the individual port controllers which store the two bounds in registers reserved for that purpose. During switch operation, each port controller receives a time slot identifier, or receives a signal which it transforms into a time slot identifier. Each port checks the time slot identifier against its lower bound and its upper bound registers to determine whether the time slot identifier is within the port's allocated range. If the time slot identifier is within the allocated range, the port controller accesses the common-memory to read or write packets or cells. The mechanism for generating time slot identifiers preferably distributes the access time periods so that access to the core memory by each port is as equally spaced as possible to ensure that packet jitter is reduced.

The time slot identifiers are preferably generated by a cyclic counter of large period (16,384 for example) called an access control cycle. A good distribution of time slot identifiers can be achieved by reading a binary representation of the cyclic counter in reverse.

In accordance with a further aspect of the invention, there is provided an architecture for a large capacity CM switch which is expressly designed for multicast applications. The switch architecture may include more output ports than input ports, but it is preferably symmetrical. A symmetrical switch is one that has an equal number of ports which are collectively of equal capacity on each side (ingress and egress). In a symmetrical switch in accordance with the invention, the ports need not be of equal capacity and in the discussion which follows it is assumed that the ports may not be of collectively equal capacity on each side. If a symmetrical architecture is used, the total combined capacity of all input and output ports preferably exceeds the core capacity. Access to the input and output ports is controlled as described above to maximize core usage.

Very high-capacity switches are best constructed using a folded architecture in which a plurality of CM switches are interlinked by middle buffers that permit the movement of intermodular data traffic between CM modules. With heavy multicasting, a single stand-alone configurable CM switch can realize a multicast capacity gain of almost 2 to 1, i.e., the switch can emit almost twice as many bits per second (b/s) into the network as a prior art packet switch with the same CM and port configuration. For a large scale multi-module folded configuration switch with flexible CM access rate allocation, a higher multicast capacity gain can be realized. Using 64 folded CM modules, each with a capacity of 20 Gb/s, for example, the egress capacity would be 640 Gb/s with fixed-rate ports, whereas with flexible CM access rate allocation, the egress capacity can exceed 2 Terabits/s at high multicast levels.

BRIEF DESCRIPTION OF THE DRAWINGS

The invention will now be further explained by way of example only and with reference to the following drawings, wherein:

FIG. 9a is a table showing the number of cells transferred by the CM modules during an access interval (a period of time during which each input port and each output port has access to a particular middle buffer) in a large capacity switch of the type illustrated in FIG. 8a.

DETAILED DESCRIPTION OF THE PREFERRED EMBODIMENT

The present invention relates to a method and apparatus for maximizing core utilization in a CM data packet switch by allocating CM access time to the individual ports of the data packet switch in accordance with committed access capacity and/or predicted traffic load for each port.

A basic asynchronous transfer mode (ATM) CM switch is constructed as a cell-wide bus connected to a cell-wide array of memories, constituting the CM. The CM is accessed cyclically by N dual ports (N input and N output ports). During a CM access time period, a minimum of one cell is written to, or read from, the CM by a port. The capacity of a CM switch is determined by the CM's access speed. For example, an access time (read+write) of 21 nsec in an ATM switch (i.e., one 424-bit cell per 21 nsec) yields a 20 Gb/s switch.

Figure 1:
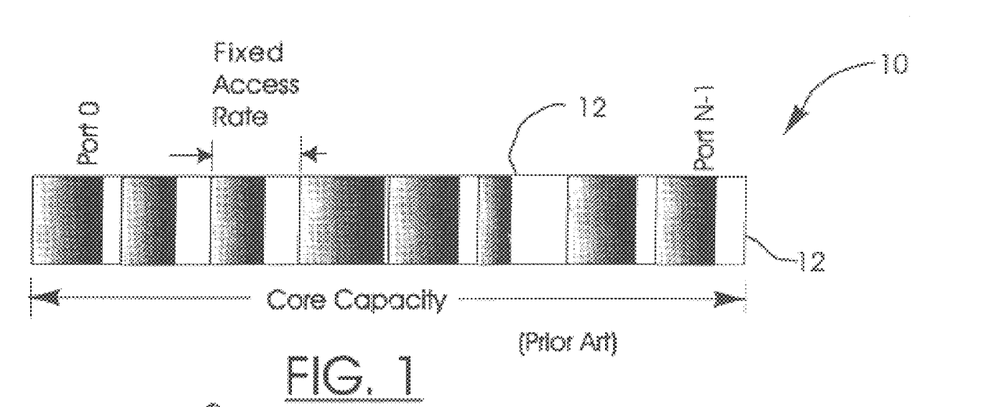
FIG. 1 is a schematic representation of core capacity utilization in a prior art CM packet switch.

FIG. 1 is a schematic illustration of core capacity utilization by a fixed access rate prior art CM packet switch. The core capacity 10 is represented by a horizontal bar which is divided into eight equal sections representative of the equal CM access time periods for the eight ports (four input ports and four output ports) of a 4×4 switch. A shaded portion 12 represents the part of each allocated access time period utilized by a port to access the CM during its fixed CM access time interval. As is apparent, some ports are busier than others due to traffic load. Because of the fixed time interval which each port has to access the CM of the packet switch, however, core resources are under-utilized when a port experiences little traffic.

In a symmetrical switch with N identical dual ports, the access rate to the CM by each port is R b/s at input and R b/s at output, and the CM dual-access (ingress and egress) rate is C b/s at ingress and C b/s at egress, with $C \geq N R$. In a symmetrical switch configuration, the total ingress rate C equals the total egress rate C. If traffic is aggregated using multiplexers, there is higher utilization of the core capacity. The sources should be grouped at the ports to provide appropriate traffic concentration. It is not always feasible to aggregate traffic, however, and port capacity may remain under-utilized.

The number of ports of capacity R, in a symmetrical configuration is $N=\lfloor C/R \rfloor$. If the port access rate is dynamically regulated, provided that the sum of the ingress rates does not exceed C, a packet switch configuration with a number of ports greater than N can be realized. Such a packet switch configuration easily accommodates temporal variation in the connections' asymmetry.

Figure 2:
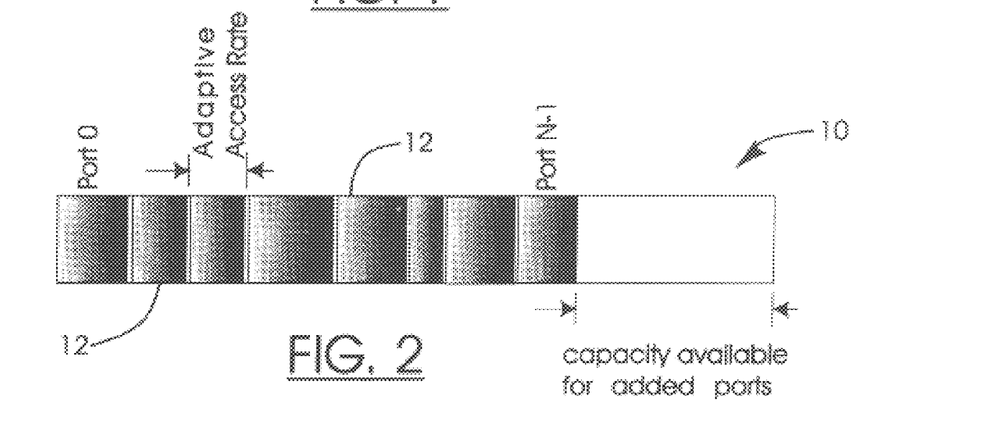
FIG. 2 is a schematic illustration of the capacity available for added ports in a CM packet switch when a flexible access rate is utilized to control access to the common-memory by the input and output ports.
Figure 3:
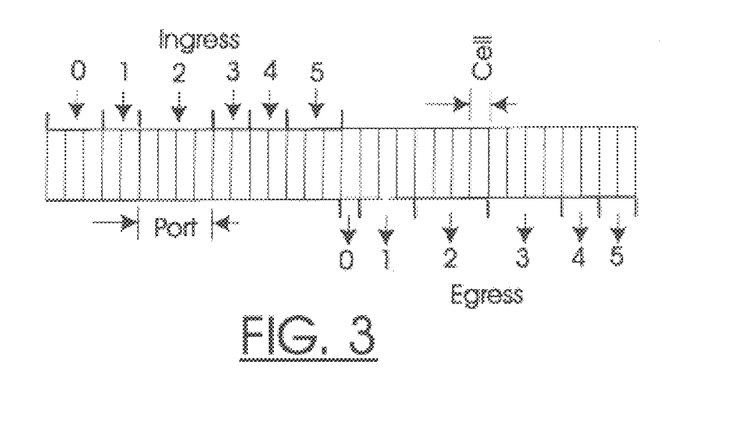
FIG. 3 is a schematic illustration of the time slots allocated in a CM packet switch having symmetrical sides and asymmetrical CM access in a 6×6 packet switch.

FIG. 2 schematically illustrates the utilization of the core capacity 10 shown in FIG. 1 in a switch having an adaptive access rate in which the access rates are allocated to efficiently use core capacity.

Without CM access control, the port capacity of a switch is fixed at its predetermined value, 620 Mb/s for example. In a 20 Gb/s switch, the maximum number of ports with fixed port rate of 620 Mb/s is 32. With a flexible CM access rate, the number of ports may be increased to 64, for example, and the traffic loads to the ports may vary considerably, both spatially and temporally, provided that the total traffic load at any given moment is less than the CM capacity.

The allocation of CM access time to the ports is preferably updated in response to traffic load variations. The access time slot identifiers are stored in a common-memory-access control table, as will be explained below in further detail. The control table is inspected to determine the CM access time allocation for each port at least as often as the switch undergoes an initialization process, well known in the art. In a preferred embodiment of the invention, the common-memory-access control table is periodically updated to ensure maximum CM utilization. The CM access time allocations written in the common-memory-access control table may be computed by a predictive algorithm which collects port usage data and directly or predictively allocates CM access time accordingly. Alternatively, the traffic measurements or predictive algorithm may operate at the network control level and common-memory-access control table data may be downloaded to a CM packet switch in accordance with the invention from a network control centre. The frequency of update of the common-memory-access control tables is a matter of design choice. The update may occur every few control cycles, every 4th control cycle, for example. The predictive algorithm(s) is not a part of this invention.

The initial or default CM access time allocation for any given CM packet switch port is set to accommodate the maximum committed service rate for the port, which may be less than the physical capacity of the port. Port access to the CM must be coordinated in order to ensure that ports do not attempt to access the CM concurrently. In order to regulate port access to the CM, a simple solution is to allocate contiguous bands of access time slot identifiers proportioned in accordance with committed access capacity or predicted traffic loads for a port. Contiguous access to the CM by a port is not preferred, however, because packet or cell transit delays could be unacceptably long and severe cell jitter could result. This is avoided by using the method in accordance with the invention to generate time slot identifiers so that CM access time slots for each port are distributed as evenly as possible.

In accordance with the method of generating time slot identifiers, C represents the CM capacity in bits/second in each direction (C ingress, C egress), R the capacity per port in bits/second, and N the number of dual ports (N ingress and N egress). The sum of the port capacities may be greater than the CM capacity, i.e., $NR \geq C$. Let S be the number of access time slots per CM access control cycle (S=16384, for example). The service rate per access time slot, i.e., the granularity of the data rate, is then C/S.

Let $a_j$ be the service rate allocation for input port j and $x_j$, $0 \leq j < N$, be the number of assigned access time slots per control cycle for input port j, the integer $x_j$ is then determined as: $x_j = \lceil a_j S/C \rceil$, where $\lceil . \rceil$ denotes the next higher integer. The actual service rate allocation for input port j is then: $A_j = x_j C/S$; $A_j \geq a_j$.

Similarly, on the egress side, if $b_j$, $0 \leq j < N$, is the required service rate for output port j, and $y_j$, $0 \leq j < N$, is the number of assigned access time slots per control cycle for output port j, then $y_j = \lceil b_j S/C \rceil$ and the actual service rate allocation for output port j is:

$$B_j = y_j C/S; \; B_j \geq b_j.$$

For a non-blocking, flexible access-rate switch, we have:

$$\sum_{k=0}^{N-1} x_k \leq S, \text{ and } \sum_{k=0}^{N-1} y_k \leq S,$$

i.e., the sum of the allocated access capacities on either the ingress or egress side is limited by the capacity C:

$$\sum_{k=0}^{N-1} A_k \leq C, \text{ and } \sum_{k=0}^{N-1} B_k \leq C,$$

with $A_k \leq R$ and $B_k \leq R$, $0 \leq k < N$.

In order to reduce cell-transfer delay, the $x_j$ access time slots should not occupy contiguous positions in the CM access control cycle. They can be spread almost evenly in the control cycle as follows: Generate the sequences $X_j$: $X_j \leftarrow x_{j-1} + X_{j-1}$, $1 \leq j < N$, with $X_0 = 0$; and $Y_j$: $Y_j \leftarrow y_{j-1} + Y_{j-1}$, $1 \leq j < N$, with $Y_0 = X_N$.

These sequences are used to generate time slot identifiers for controlling port access to the CM, as will be explained below in detail ($Y_N$ is the length of the control cycle).

The preferred mechanism for generating time slot identifiers is a simple mapping method using a reverse-binary representation of an integer count. In accordance with the method, a cyclic counter of large period (16,384 for example) called the access control cycle is read in reverse: i.e., the most significant bit is treated as the least significant bit and the least significant bit is treated as the most significant bit. The counter is preferably incremented at an interval equal to the time required to read/write a predefined number of packets or cells (usually 1) to the CM. As described above, the common-memory-access control table defines a contiguous band of access time slot identifiers allocated to each port of the CM packet switch. The contiguous bands are preferably defined in the table using a lower bound integer and an upper bound integer. If k denotes the reverse-binary number representation of the counter, input port j accesses the CM if:

$X_j \leq k < X_{j+1}$.

Similarly, output port j accesses the CM if:

$Y_j \leq k < Y_{j+1}$,

The integer k is the time slot identifier corresponding to the reading of the counter. Thus, the CM access time slot identifiers for the ports are mutually exclusive and only one port can access the CM during any given time slot. The lower and upper bounds for ingress port j are $X_j$ and $X_{j+1} - 1$, and similarly the lower and upper bounds for egress port j are $Y_j$ and $Y_{j+1} - 1$, $0 \leq j < N$.

Figure 4:
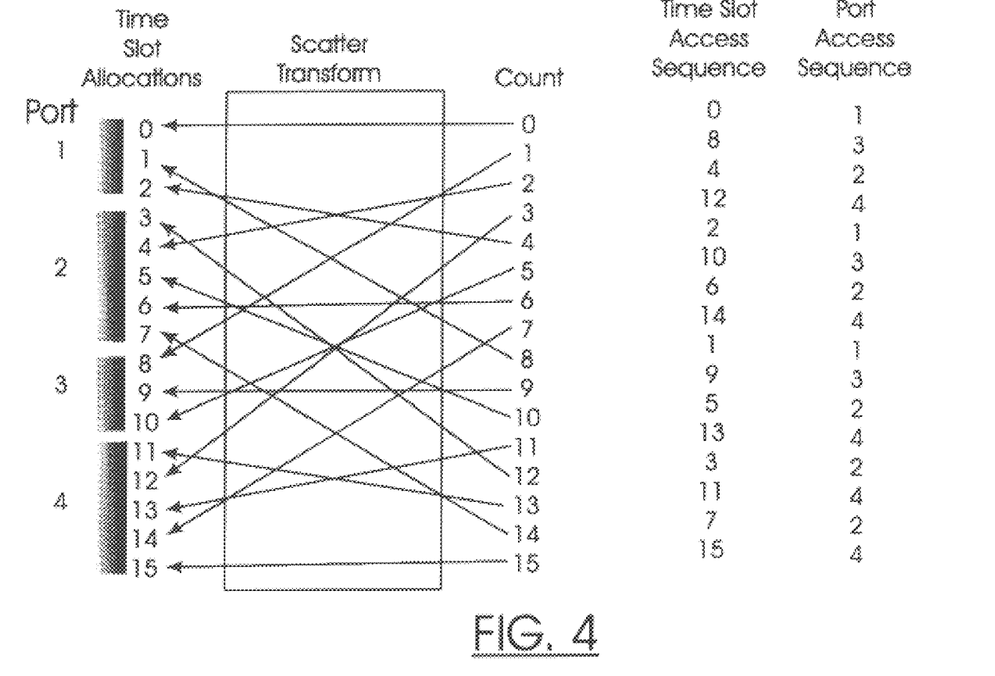
FIG. 4 is a simplified illustration of the distribution of CM access by the ports of a 2×2 CM packet switch using a simple 4-bit counter and a reverse-binary scatter transform to generate time slot identifiers for controlling port access to the CM.

A simple representation of this method is shown in FIG. 4 where a 4 bit cyclic counter is used to control access by four ports to a CM using asymmetrical CM access time allocations. As is shown in FIG. 4, port 1 is allocated time slots identified by numbers 0–2; port 2 is allocated access time slots identified by numbers 3–7; port 3 is allocated time slots identified by numbers 8–10; and, port 4 is allocated time slots identified by numbers 11–15. The scatter transform used to convert the cyclic count to time slot identifiers may be any algorithm for achieving well-spaced access times. In accordance with the preferred embodiment of the invention, the scatter transform is most simply and economically realized by hard wiring a cyclic digital counter so that it may be read in reverse. The cyclic counter is preferably of a finite word length having a range equal to the total CM access time slots allocated in the common-memory-access control table. The result achieved is illustrated in FIG. 4. The time slot identifiers generated by the scatter transform and the port access sequence are shown on the right side of FIG. 4.

It is readily apparent that the port access sequence is well distributed in the time domain and cell jitter is thereby reduced. It will also be readily appreciated by those skilled in the art that the actual period of the cyclic counter is a function of the number of ports and is normally much larger than that shown in FIG. 4. The period of the cyclic counter is conveniently a power of 2, though that is not essential.

The scatter transform could be implemented in software, but the reverse-wired digital counter is considered the most economical implementation and has the advantage of being very fast.

It will be understood by those skilled in the art that the scatter transform may be implemented at the central controller of the CM switch, in which case time slot identifiers are broadcast to the port controllers, or at each port controller, in which case the count is broadcast to the port controllers and the port controllers apply the scatter transform to produce the time slot identifiers.

As may be seen in FIG. 4, the access time slot allocations are asymmetrically distributed among the four ports. A primary feature of the invention is that the allocation of access time slots may be asymmetrical between ports and between the ingress and egress sides of the same port. This permits a flexible, dynamic configuration of switch resources in response to a committed access capacity for each port or predicted or measured traffic fluctuations.

Figure 5:
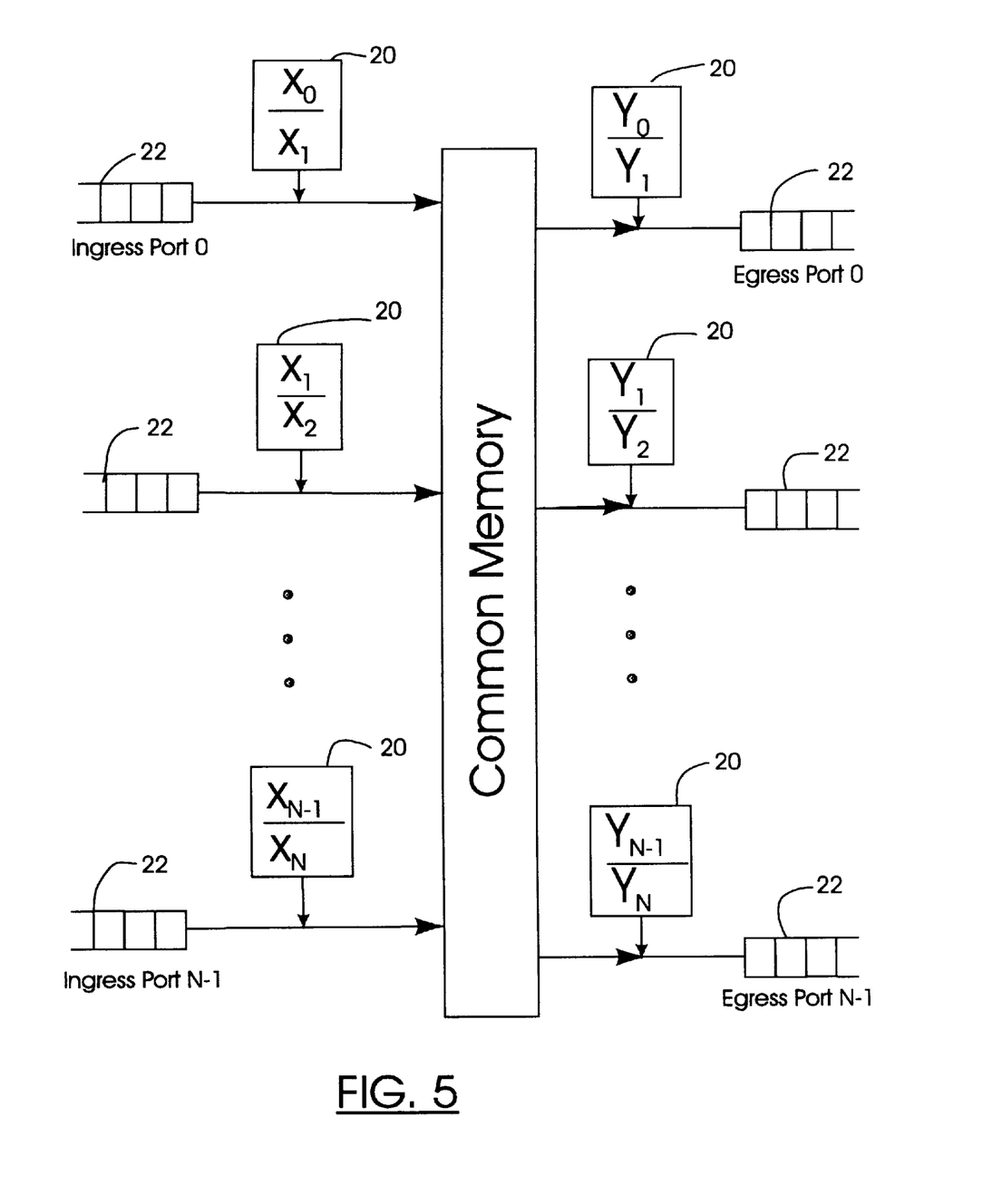
FIG. 5 is a schematic diagram of a CM packet switch in accordance with the invention.

FIG. 5 shows a schematic illustration of a CM packet switch with flexible port access rates in accordance with the invention. The access time slots for any port are determined by a simple comparison between the reverse-binary of the cyclic counter and the upper and lower bound values of the access time slot identifiers. As explained above, the upper and lower bound values may be passed to the port controllers from the common-memory-access control table. The upper and lower bound values are stored in registers 20 at each port controller. For example, if a port is allocated CM access time slots in a band of 1000–1080 in a control cycle having a length of 16384, the port is permitted to access the CM when the reverse-binary of a global 14-bit counter is greater than 999 and less than 1080. The CM access time slots for any given port follow a cyclic pattern dictated by the period of the cyclic counter and the length of the control cycle. Within a control cycle, the access time slots for a port may not be exactly evenly spaced. To absorb periodic fluctuations, a short smoothing buffer 22, with a capacity of a few packets or cells (typically less than five packets or cells) is required, as shown in FIG. 5.

As explained above, in a unicast symmetrical packet switch, the total ingress rate and the total egress rate are equal. The ingress capacity C is shared by the ingress ports and the egress capacity C is shared by the egress ports. In a multicast switch, it is advantageous to pool the entire capacity 2C and share the pooled capacity among the ingress and the egress ports.

Figure 6:
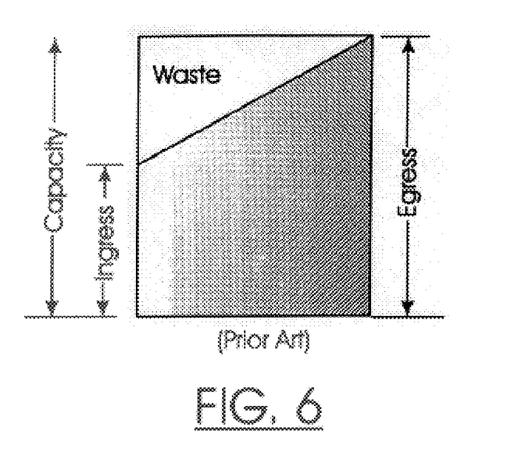
FIG. 6, which appears on sheet 5 of the drawings, is a schematic diagram of CM core utilization in a symmetrical CM packet switch during heavy multicasting.

If one uses a prior art symmetrical switch for multicasting, core capacity is wasted as shown in FIG. 6. Using the method in accordance with the invention, the wasted CM capacity can be transferred to the egress side, thereby increasing packet throughput and reducing switch cost.

A multicast packet switch processes both unicast and multicast data packet connections. In a CM packet switch, because a multicast packet or cell is written once to the common-memory and read several times (once by each output port which emits the packet into the network), the egress rate is greater than the ingress rate. This imbalance should be taken into account when designing both the network and the packet switching nodes. Preferably, the packet switching nodes are configured in accordance with the invention so that they are sufficiently flexible to handle varying levels of multicast connections. A flexible packet switching node architecture is provided by a switch configuration having an equal number of ingress and egress ports which are collectively of equal capacity. The total capacity of all ports may substantially exceed the CM core capacity of 2C. With flexible service rate regulation, however, the allocated ingress and egress CM access rate is always limited to 2C. This permits large spatial and temporal variations in the multicast level to be accommodated dynamically without physical reconfiguration of the switch. With a switch of this configuration, the method of flexible access-rate allocation in which time slot identifiers are generated, as described above, permits a high resolution of access to the CM and, consequently, flexible control. The switch configuration shown in FIG. 5 is preferably used to pool the ingress and egress CM access capacity with access time slot allocations based on committed or predictive port access rates. Thus, if the number of ingress CM access time slots is represented by $x_k$, and the number of egress CM access time slots is represented by $y_k$, k=0 . . . N−1, then:

$$\sum_{k=0}^{N-1} (x_k + y_k) \leq 2S.$$

The sum of the actual ingress CM access rate allocations $A_k$, and egress CM access rate allocations, $B_k$, k=0 . . . N−1, where $A_k$ and $B_k$ are determined as described above, is limited by 2C:

$$\sum_{k=0}^{N-1} (A_k + B_k) \leq 2C.$$

The total ingress rate cannot exceed the total egress rate. Therefore, the total ingress rate cannot exceed C, while the total egress rate may exceed the total ingress rate:

$$\sum_{k=0}^{N-1} A_k \leq C, \text{ and } \sum_{k=0}^{N-1} B_k \geq \sum_{k=0}^{N-1} A_k.$$

In order to build packet switches with a higher capacity, CM switches may be used as construction modules. In the prior art, higher capacity switches have generally been constructed as multi-stage arrangements. One known way to achieve higher capacity, high-performance switches is to use an array of memories called middle buffers which are visited cyclically by each CM module. Separate CM modules may be used for ingress and egress, or folded arrangements may be used where each CM module serves in both the ingress and the egress stages.

The folded arrangement provides more flexibility because it is possible to control access to a CM module in response to four separate service rates, namely x, y, u and v, which are defined as follows:

x=total ingress rate for a given CM module;
u=input rate to middle buffers of data destined to other modules;
v=output rate of data from middle buffers to the given CM module; and
y=total egress rate from the given CM module.

Figure 7:
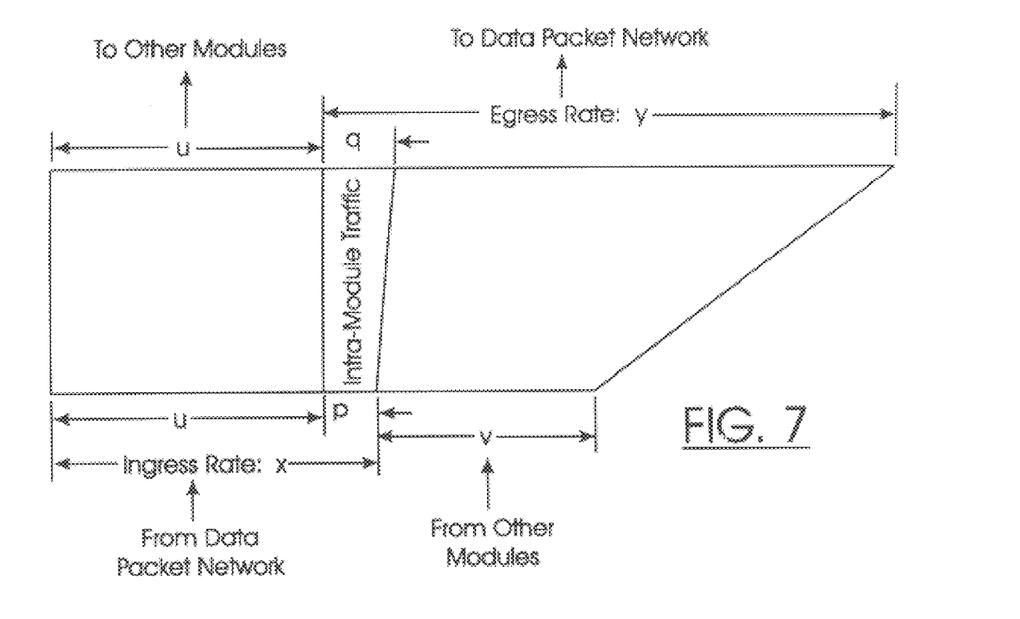
FIG. 7, which appears on sheet 2 of the drawings, is a schematic illustration of data flow through a CM module of a high capacity packet switch with a folded architecture.

FIG. 7 schematically illustrates the packet flow through a CM module of a high capacity switch with a folded configuration. Data packets enter the module from the packet network through the input ports at an ingress bit rate of x b/s. A portion of the ingress traffic load p may be switched directly across the module to the module's output ports. Because of multicasting, the input intra-modular traffic p b/s may be less than the output intra-modular traffic q b/s. The remainder of the ingress x b/s is destined for the output ports of other modules in the folded configuration. Those input packets of bit rate u b/s flow through the module to the middle buffers of the high-capacity switch, as will be explained below in more detail. Likewise, packets received by other modules that are addressed to links served by output ports of the module are received from the middle buffers as input packets of bit rate v b/s. As is apparent from FIG. 7, as a result of multicasting, the egress bit rate y b/s may be considerably higher than v+p because a multicast packet is read only once from the middle buffers but it is read from the CM by each output port to which it is addressed.

Figure 8A:
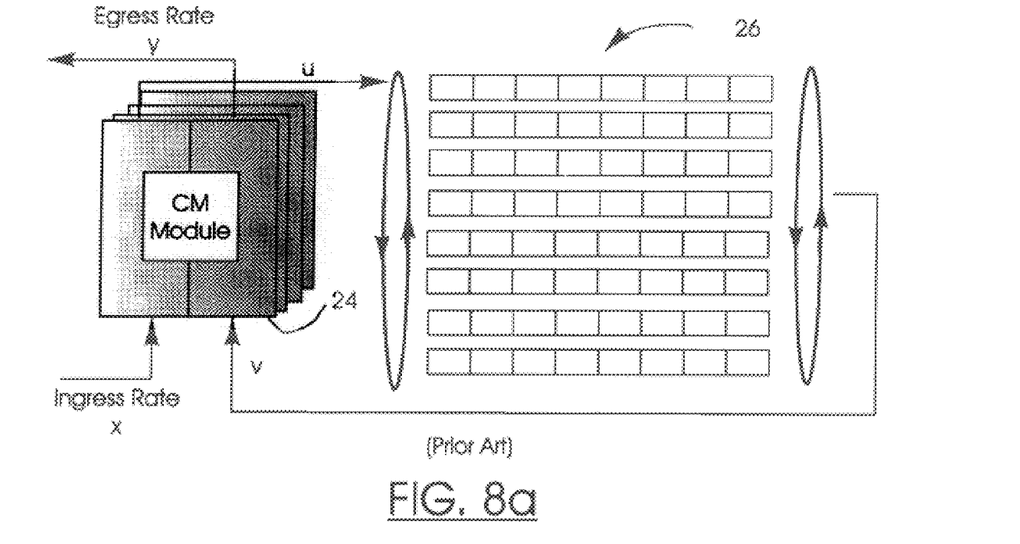
FIG. 8a is a schematic diagram of a prior art high capacity switch consisting of an array of M folded symmetrical CM modules.

FIG. 8a is a schematic diagram of a prior art high capacity switch consisting of an array of M folded symmetrical CM modules 24, each having a capacity C. Each CM module 24 has an access capacity to middle buffers 26 of C/2. Each middle buffer 26 is logically divided into a number of sections equal in number to the egress modules (M) and equal in size. The total egress capacity has an upper bound of M C/2.

Figure 8B:
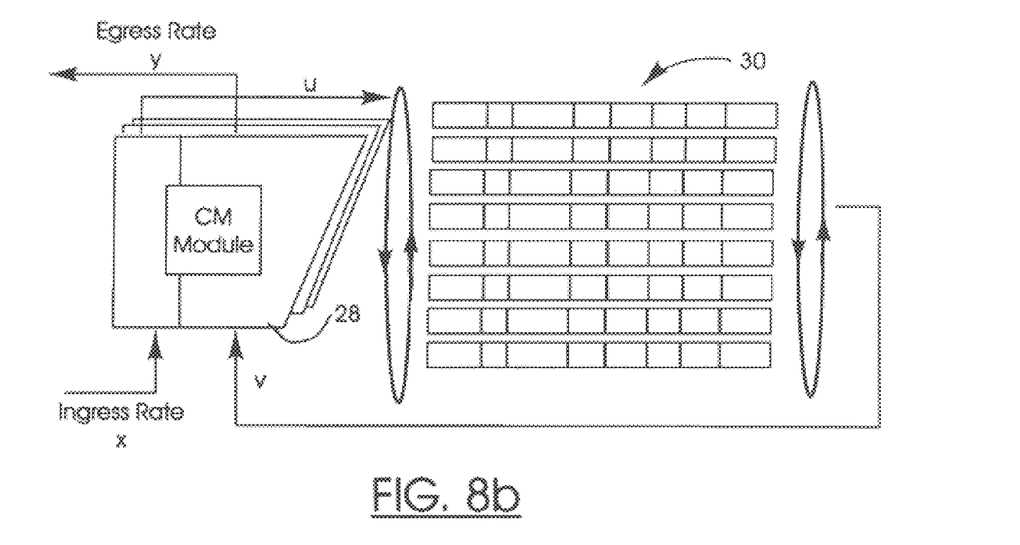
FIG. 8b is a schematic diagram of the high capacity switch configured in accordance with the invention for use in multicasting.

FIG. 8b is a schematic diagram of a high-capacity switch in accordance with the invention in which the ingress rate per CM module 28 is lower than the egress rate because of packet multicasting. Each CM module 28 is therefore configured to deliver data to the middle buffers 30 at a rate which may be less than C/2. The sections of the middle buffers 30 are therefore not necessarily of equal size, and the total egress capacity may be significantly greater than M C/2. Each CM module 28 can be individually configured according to the committed access rates or the predictive packet traffic loads, as explained above with reference to FIGS. 4 and 5.

In addition, as is well known in the art, the high-capacity switches shown in FIGS. 8a and 8b may include a central controller (not illustrated) which coordinates access to the middle buffers 26,30. The access to the middle buffers 30 can therefore also be controlled in order to improve the overall efficiency of the packet switch. Since reading and writing operations to the middle buffers typically operate a little faster than port I/O rates, a coarser control of middle buffer access can be implemented without sacrificing overall efficiency. Control of access to the middle buffers 30 may be exercised by the central controller by proportioning the transfer rates u and v in accordance with the committed access rate or predicted traffic load for each CM module 28. The transfer rates u and v follow directly from the access time slot allocations for each CM module's ports, and the central controller preferably uses data from the common-memory-access control tables for computing the middle buffer transfer rates.

With the prior art high-capacity switch shown in FIG. 8a, if a middle buffer access interval (a period of time during which each input and each output port has access to a particular middle buffer) is selected so that 16 ATM cells are transferred: 16 cells are transferred from a CM module 24 to one of the middle buffers 26, and 16 cells are transferred from one of the middle buffers 26 to the CM module 24 during the access interval. With a packet or cell transfer time of approximately 20 nsec, a 16 cell access interval is approximately 320 nsec, plus some guard time.

For the high-capacity switch in accordance with the invention shown in FIG. 8b, the access rate is preferably selected to be in a range from 1 to 16 packets or cells per access interval. The transfer rate to the middle buffers 30 from the CM module 28, and from the middle buffers 30 to the CM module 28, may be independently regulated.

In the symmetrical configuration shown in FIG. 8a, the CM ingress rate equals the CM egress rate, and each is bounded by C:

$$(x+v)=(u+y) \leq C,$$

and typically $$x=u=v=y=C/2.$$

In the flexible configuration shown in FIG. 8b, the middle buffer input and output rates for each module are selected to match the committed access capacity and the only restriction is that the entire packet or cell traffic (in bits per second) through the switch be bounded by 2C, therefore:

$$x+u+v+y \leq 2C.$$

For any given CM ATM module 28, the number of cells transferred to the middle buffers 30 per access time interval is proportional to the CM module's committed access capacity or a predicted traffic load. Likewise, the number of cells transferred from the middle buffers 30 to the CM module 28 per access interval is proportional to the modules egress link capacity, taking multicasting into account.

Figure 9A:
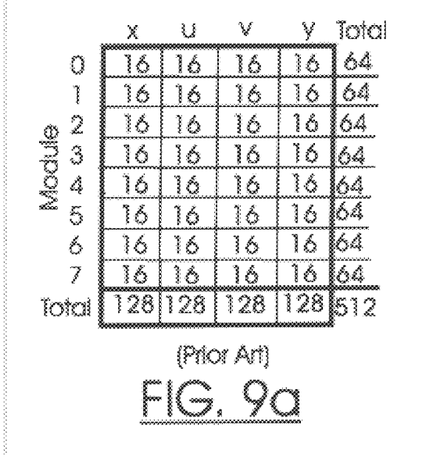
Figure 9B:
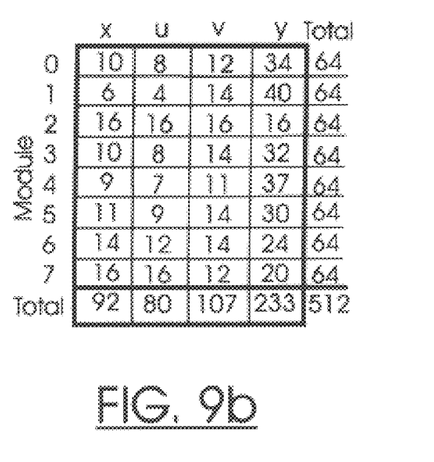
FIG. 9b is a table showing the number of cells transferred by the CM modules during an access interval in a large capacity switch of the type illustrated in FIG. 8b.

FIGS. 9a and 9b show an example cell or packet transfer with bit rates of x, u, v and y for symmetrical and asymmetrical high-capacity switches which include eight CM modules 24,28 and eight middle buffers 26,30, respectively. FIG. 9a is a table of the ATM cells transferred by each module 24 during an access interval in the symmetrical switch architecture shown in FIG. 8a. Sixteen packets or cells are transferred by each module 24 so that the switch throughput per access interval is 128 cells.

FIG. 9b shows an example of the cells which may be transferred during an access interval of an asymmetrical flexible access packet switch in accordance with the invention. In this example, module 0 for example writes 8 cells to the middle buffers 30 but reads 12 cells from the middle buffers 30 during each access interval. The sum of the input rates to the middle buffers 30 from all CM modules 0–7 is smaller than the sum of output rates from all CM modules 0–7 (80 vs. 107) because of multicasting. A multicast cell is written only once to a middle buffer 30. It may be read by several CM modules 28 and within each CM module 28 it may be read by several output ports. The egress capacity is 128 cells per access interval in the symmetrical high-capacity switch. In the example shown in FIG. 9b, 233 cells were output by the asymmetrical high-capacity packet switch in accordance with the invention yielding a capacity gain of 1.8. Real output rates depend, of course, on the extent of multicasting, and it is possible to construct examples where the capacity gain approaches a factor of four.

With asymmetrical connections and multicasting in a multiservice network, the switching node architecture should be configured to achieve high efficiency across the network. The flexible access dynamically configurable switching nodes enabled by the invention can facilitate the design of an efficient network that will serve high-variance heterogeneous traffic.

The examples described above are intended to be exemplary only. The scope of this invention is therefore intended to be limited solely by the scope of the appended claims.

What I claim is:

1. A method of controlling port access to the common-memory of a common-memory multi-port data packet switch, comprising:

defining a control cycle consisting of a fixed number of discrete common-memory access time slots;

allocating a proportional number of the access time slots to each port based on a predetermined access capacity requirement for the port; and distributing access time slots for each port in the control cycle in such a way as to reduce packet transfer delay and jitter.

2. A method of controlling asymmetrical port access in a common-memory multi-port data packet switch, comprising:

a) at least during each execution of an initialization process for the data packet switch, inspecting a common-memory-access control table to determine a lower bound and an upper bound of a unique contiguous band of common-memory access time slots allocated to each port and passing the lower bound and the upper bound to a controller for each port;

b) continuously maintaining a cyclic count having a maximum value equal to the number of access time slots allocated in the control table; and c) applying a scatter transform to the count each time it is incremented to obtain a scattered transform result, whereby each port controller is enabled to access the common-memory when the transform result is greater than or equal to the lower bound and less than the upper bound passed to the port controller.

3. A method of controlling asymmetrical port access in a common-memory multi-port data packet switch as claimed in claim 2 wherein the access time slot allocations in the common-memory-access control table are computed by a common-memory-access control algorithm.

4. A method of controlling asymmetrical port access in a common-memory multi-port data packet switch as claimed in claim 3 wherein the common-memory-access control algorithm periodically computes the access time slot allocations for a control table based on short term predicted network traffic load.

5. A method of controlling asymmetrical port access in a common-memory multi-port data packet switch as claimed in claim 4 wherein the common-memory-access control algorithm computes a new control table every Nth control cycle, wherein N is an integer greater than, or equal to, 1.

6. A method of controlling asymmetrical port access in a common-memory multi-port data packet switch as claimed in claim 2 wherein the scatter transform comprises a reverse conversion of a binary representation of the count, the least significant bit of the binary representation becoming the most significant bit of the result.

7. A flexible access rate common-memory packet switch, comprising:

a plurality of input ports and output ports;

a common-memory for switching packets between the input ports and the output ports;

means for storing an allocation of common-memory access time slots for each port, the allocation being based on a predetermined access capacity requirement for the port; and means for distributing the access time slots for each port in a control cycle of all access time slots allocated in such a way that each port accesses the common-memory in a cyclic sequence of substantially equally spaced access time slot intervals.

8. A flexible access rate common-memory packet switch, comprising:

a common-memory switch module having an ingress side and an egress side;

a plurality of input ports connected to the ingress side of the common-memory switch module;

a plurality of output ports connected to the egress side of the common-memory switch module;

a smoothing buffer associated with each of the input and output ports;

a common-memory-access control table for defining a unique contiguous band of discrete access time slot allocations for access to the common-memory by each of the input and output ports;

means for sequentially generating time slot identifiers so that access to the common-memory switch module is enabled for each port in a substantially evenly spaced relationship; and means for enabling a specific port to access the common-memory switch module when a time slot identifier indicates a time slot within the contiguous band allocated to that port.

9. A flexible access rate common-memory packet switch as claimed in claim 8 wherein the smoothing buffer is a short buffer having a capacity of less than 5 packets.

10. A flexible access rate common-memory packet switch as claimed in claim 8 wherein the means for sequentially generating a time slot identifier comprises:

a counter for continuously maintaining a count, the counter being of a finite word length having a range corresponding to the total number of access time slots allocated in the common-memory-access control table; and a scatter transform for converting the count to the time slot identifier.

11. A flexible access rate common-memory packet switch as claimed in claim 10 wherein the scatter transform for converting the count to the time slot identifier comprises means for reversing a binary representation of the count so that the least significant bit becomes the most significant bit of the time slot identifier.

12. A flexible access rate common-memory packet switch as claimed in claim 8 wherein the common-memory packet switch further comprises a common-memory-access control table algorithm for generating the access time slot allocations in the common-memory-access control table.

13. A flexible access rate common-memory packet switch as claimed in claim 12 wherein the common-memory-access control table algorithm periodically generates common-memory-access control table access-time-slot allocations based on a predictive algorithm of traffic load at the respective input and output ports of the packet switch and the smoothing buffers at the input ports are replaced by long buffers which can accommodate a plurality of packets.

14. A flexible access rate common-memory packet switch as claimed in claim 8 wherein the common-memory packet switch is a multicast switch.

15. A flexible access rate common-memory packet switch as claimed in claim 14 wherein the multicast switch has more output ports than input ports.

16. A flexible access rate common-memory packet switch as claimed in claim 8 wherein the common-memory packet switch is a unicast switch but the ports are respectively allocated contiguous bands of time slots proportioned to accommodate a committed access capacity for each port.

* * * * *